United States Patent
Gao et al.

(10) Patent No.: US 8,343,364 B1
(45) Date of Patent: Jan. 1, 2013

(54) DOUBLE HARD-MASK MILL BACK METHOD OF FABRICATING A NEAR FIELD TRANSDUCER FOR ENERGY ASSISTED MAGNETIC RECORDING

(75) Inventors: Wei Gao, Fremont, CA (US); Guanxiong Li, Fremont, CA (US); Zhongyan Wang, San Ramon, CA (US); Yufeng Hu, Fremont, CA (US); Ge Yi, San Ramon, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 420 days.

(21) Appl. No.: 12/796,585

(22) Filed: Jun. 8, 2010

(51) Int. Cl.
*G11B 5/33* (2006.01)

(52) U.S. Cl. ............... 216/22; 216/41; 216/47; 216/51; 216/72; 216/74; 216/75; 216/76; 216/77; 29/603.07; 204/192.34

(58) Field of Classification Search .................... None
See application file for complete search history.

(56) References Cited

U.S. PATENT DOCUMENTS

| | | |
|---|---|---|
| 4,670,732 A | 6/1987 | Church |
| 4,675,986 A | 6/1987 | Yen |
| 5,065,483 A | 11/1991 | Zammit |
| 5,199,090 A | 3/1993 | Bell |
| 5,210,667 A | 5/1993 | Zammit |
| 5,463,805 A | 11/1995 | Mowry et al. |
| 5,559,429 A | 9/1996 | Mowry et al. |
| 5,597,340 A | 1/1997 | Church et al. |
| 5,722,155 A | 3/1998 | Stover et al. |
| 5,755,612 A | 5/1998 | Schaenzer et al. |
| 5,816,890 A | 10/1998 | Hao et al. |
| 5,876,264 A | 3/1999 | Church et al. |
| 6,027,397 A | 2/2000 | Church et al. |
| 6,034,849 A | 3/2000 | Takizawa |
| 6,047,224 A | 4/2000 | Stover et al. |
| 6,193,584 B1 | 2/2001 | Rudy et al. |
| 6,330,488 B1 | 12/2001 | Yoshida et al. |
| 6,347,983 B1 | 2/2002 | Hao et al. |
| 6,399,401 B1 | 6/2002 | Kye et al. |
| 6,532,646 B2 | 3/2003 | Watanuki |
| 6,609,948 B1 | 8/2003 | Fontana, Jr. et al. |
| 6,623,330 B2 | 9/2003 | Fukuroi |
| 6,684,171 B2 | 1/2004 | Church et al. |
| 6,699,102 B2 | 3/2004 | Reiley et al. |
| 6,728,067 B2 | 4/2004 | Crawforth et al. |
| 6,758,722 B2 | 7/2004 | Zhu |
| 6,795,630 B2 | 9/2004 | Challener et al. |
| 6,834,027 B1 | 12/2004 | Sakaguchi et al. |

(Continued)

OTHER PUBLICATIONS

Bill Challener, "Plasmonic transducer for near field heat assisted magnetic recording", 2009 CMOS Emerging Technologies Workshop, Sep. 24, 2009, 19 pages.

*Primary Examiner* — Anita Alanko

(57) ABSTRACT

A method of forming a near field transducer (NFT) for energy assisted magnetic recording is disclosed. A structure comprising an NFT metal layer and a first hardmask layer over the NFT metal layer is provided A first patterned hardmask is formed from the first hardmask layer, the first patterned hardmask disposed over a disk section and a pin section of the NFT to be formed. An etch process is performed on the NFT metal layer via the first patterned hardmask, the etch process forming the NFT having the disk section and the pin section.

27 Claims, 13 Drawing Sheets

U.S. PATENT DOCUMENTS

| | | |
|---|---|---|
| 6,857,937 B2 | 2/2005 | Bajorek |
| 6,884,148 B1 | 4/2005 | Dovek et al. |
| 6,950,289 B2 | 9/2005 | Lam et al. |
| 6,982,042 B2 | 1/2006 | Church et al. |
| 7,014,530 B2 | 3/2006 | Kasiraj et al. |
| 7,139,152 B2 | 11/2006 | Mahnad et al. |
| 7,149,061 B2 | 12/2006 | Yamakura et al. |
| 7,206,172 B2 | 4/2007 | Ding et al. |
| 7,215,629 B2 | 5/2007 | Eppler |
| 7,244,169 B2 | 7/2007 | Cyrille et al. |
| 7,245,459 B2 | 7/2007 | Cyrille et al. |
| 7,268,976 B2 | 9/2007 | Yamakura et al. |
| 7,271,982 B2 | 9/2007 | MacDonald et al. |
| 7,272,079 B2 | 9/2007 | Challener |
| 7,272,883 B2 | 9/2007 | Le et al. |
| 7,287,316 B2 | 10/2007 | Kasahara et al. |
| 7,330,404 B2 | 2/2008 | Peng et al. |
| 7,333,300 B2 | 2/2008 | Church et al. |
| 7,359,152 B2 | 4/2008 | Matono et al. |
| 7,360,296 B2 | 4/2008 | Cyrille et al. |
| 7,393,262 B2 | 7/2008 | Biskeborn |
| 7,821,732 B2 * | 10/2010 | Komura et al. ............... 360/59 |
| 7,861,400 B2 | 1/2011 | Lille |
| 7,936,531 B2 * | 5/2011 | Tomikawa et al. ............... 360/59 |
| 7,996,986 B2 | 8/2011 | Gokemeijer |
| 8,077,418 B1 | 12/2011 | Hu et al. |
| 8,179,628 B2 * | 5/2012 | Zhou et al. ............... 360/59 |
| 8,248,891 B2 * | 8/2012 | Lee et al. ............... 369/13.17 |
| 8,248,896 B1 * | 8/2012 | Yuan et al. ............... 369/13.33 |
| 2003/0112542 A1 | 6/2003 | Rettner et al. |
| 2003/0128634 A1 | 7/2003 | Challener |
| 2003/0137772 A1 | 7/2003 | Challener |
| 2003/0184903 A1 | 10/2003 | Challener |
| 2004/0001394 A1 * | 1/2004 | Challener et al. ............... 369/13.32 |
| 2004/0179310 A1 | 9/2004 | Lam et al. |
| 2005/0023673 A1 | 2/2005 | Nowak |
| 2005/0052771 A1 | 3/2005 | Rausch et al. |
| 2005/0078565 A1 * | 4/2005 | Peng et al. ............... 369/13.32 |
| 2006/0028770 A1 | 2/2006 | Etoh et al. |
| 2006/0044683 A1 | 3/2006 | Matono et al. |
| 2006/0103990 A1 | 5/2006 | Ito et al. |
| 2006/0126222 A1 | 6/2006 | Aoki et al. |
| 2007/0008660 A1 | 1/2007 | Yamakura et al. |
| 2007/0159720 A1 | 7/2007 | Sohn et al. |
| 2007/0165495 A1 | 7/2007 | Lee et al. |
| 2008/0068748 A1 | 3/2008 | Olson et al. |
| 2008/0072418 A1 | 3/2008 | Kondo et al. |
| 2008/0144215 A1 | 6/2008 | Hsiao et al. |
| 2008/0181560 A1 | 7/2008 | Suh et al. |
| 2008/0232225 A1 | 9/2008 | Cho et al. |
| 2010/0118664 A1 * | 5/2010 | Nishida et al. ............... 369/13.33 |
| 2010/0142079 A1 * | 6/2010 | Tanaka et al. ............... 360/59 |
| 2010/0157745 A1 | 6/2010 | Okada et al. |
| 2010/0208391 A1 | 8/2010 | Gokemeijer |
| 2010/0321814 A1 | 12/2010 | Zou et al. |
| 2011/0235480 A1 * | 9/2011 | Goulakov et al. ............... 369/13.35 |
| 2011/0292774 A1 * | 12/2011 | Osawa et al. ............... 369/13.33 |
| 2012/0230138 A1 * | 9/2012 | Endo ............... 365/203 |

* cited by examiner

US 8,343,364 B1

DOUBLE HARD-MASK MILL BACK METHOD OF FABRICATING A NEAR FIELD TRANSDUCER FOR ENERGY ASSISTED MAGNETIC RECORDING

FIELD OF THE INVENTION

The present invention generally relates to magnetic recording heads and, in particular, relates to double hard-mask mill back methods of fabricating a near field transducer for energy assisted magnetic recording.

BACKGROUND

To increase the areal storage density of a magnetic recording device, the recording layer thereof may be provided with smaller and smaller individual magnetic grains. This reduction in grain size soon reaches a "superparamagnetic limit," at which point the magnetic grains become thermally unstable and incapable of maintaining their magnetization. The thermal stability of the magnetic grains can be increased by increasing the magnetic anisotropy thereof (e.g., by utilizing materials with higher anisotropic constants). Increasing the magnetic anisotropy of the magnetic grains, however, increases their coercivity and therefore requires a stronger magnetic field to change the magnetic orientation of the grains (e.g., in a write operation).

Energy-assisted magnetic recording (EAMR) is used to address this challenge. In an EAMR system, a small spot less than ¼λ where data is to be written is locally heated to reduce the coercivity of the magnetic grains therein for the duration of the write operation, thereby allowing materials with increased magnetic anisotropy to be used, and greater areal storage density to be exploited.

In EAMR approach, a semiconductor laser diode is normally used as a light source and coupled to a planar waveguide which serves as light delivery path. A grating structure may be used to couple the laser light into the waveguide. The coupled light is then routed to a near field transducer (NFT) by which the optical energy is provided to a small optical spot on the recording media a few tens of nanometers (nm) in size.

FIG. 1 is a diagram depicting a perspective view of a so-called "Puccini-type" NFT" 100 comprising a narrow pin section 132 connected to a small disk section 134. FIG. 2 is a diagram depicting a cross-sectional view of an NFT arrangement 200 in which the NFT 100 is coupled to a waveguide structure 210 via an NFT writer gap layer 220. The pin section 132 has pin length 133, and the disk section 134 has disk size (e.g., diameter) 135, and the NFT 100 has NFT thickness 131. The NFT writer gap layer 220 provides writer gap 221 between the waveguide structure 210 and the NFT 100. In the illustrated example, the waveguide structure 220 is a waveguide core layer. Traditional approach for fabricating an NFT arrangement such as 200 of FIG. 2 involves using a milling process to form the pin section 132 followed by a lift-off process to form the disk section 134. For example, the pin section 132 is formed first by ion milling. Second, photolithography is used to form a hole which is aligned with the already-formed pin section 132. Third, the hole is filled with a metal (e.g., Au). Finally, the pin section 134 is formed from the filled metal following a lift-off process.

The traditional fabrication approach and a final NFT structure fabricated thereby suffers from a number of limitations. The writer gap 221 cannot be controlled accurately because during pin milling process, partially-exposed material of the writer gap layer 220 is milled away. In addition, during second NFT photolithography, partially-exposed material of the writer gap layer 220 is also etched away by developer. The writer gap 221 variation depending on over-milling time and photo-rework frequency. The NFT thickness 131 cannot be controlled accurately due to shadow effect and lift off milling process. The NFT thickness 131 variation depends on disk size and photo thickness. The disk size 135 has a lower limit because, with current techniques, a hole formed by the photolithography is limited to a diameter larger than 250 nm. The NFT shape is not consistent since fencing- and bow-shaped surface is typical result of a lift off process.

Accordingly, there is a need for NFT fabrication methods that address the aforementioned limitations associated with the traditional NFT fabrication approach.

BRIEF SUMMARY OF THE INVENTION

In certain aspects, a method of forming a near field transducer (NFT) for energy assisted magnetic recording is disclosed. The method comprises providing a structure comprising an NFT metal layer and a first hardmask layer over the NFT metal layer. The method can further comprise forming a first patterned hardmask from the first hardmask layer, the first patterned hardmask disposed over a disk section and a pin section of the NFT to be formed. The method can further comprise performing an etch process on the NFT metal layer via the first patterned hardmask, the etch process forming the NFT having the disk section and the pin section.

In certain aspects, a method of forming a near field transducer (NFT) for energy assisted magnetic recording is disclosed. The method comprises providing a structure comprising an NFT metal layer and a hardmask layer over the NFT metal layer. The method can further comprise forming a patterned hardmask from the hardmask layer, the patterned hardmask disposed over at least a disk section of the NFT to be formed. The method can further comprise removing a portion of an exposed region of the NFT metal layer not covered by the patterned hardmask, thereby forming at least the disk section of the NFT.

DETAILED DESCRIPTION

Figure 3:
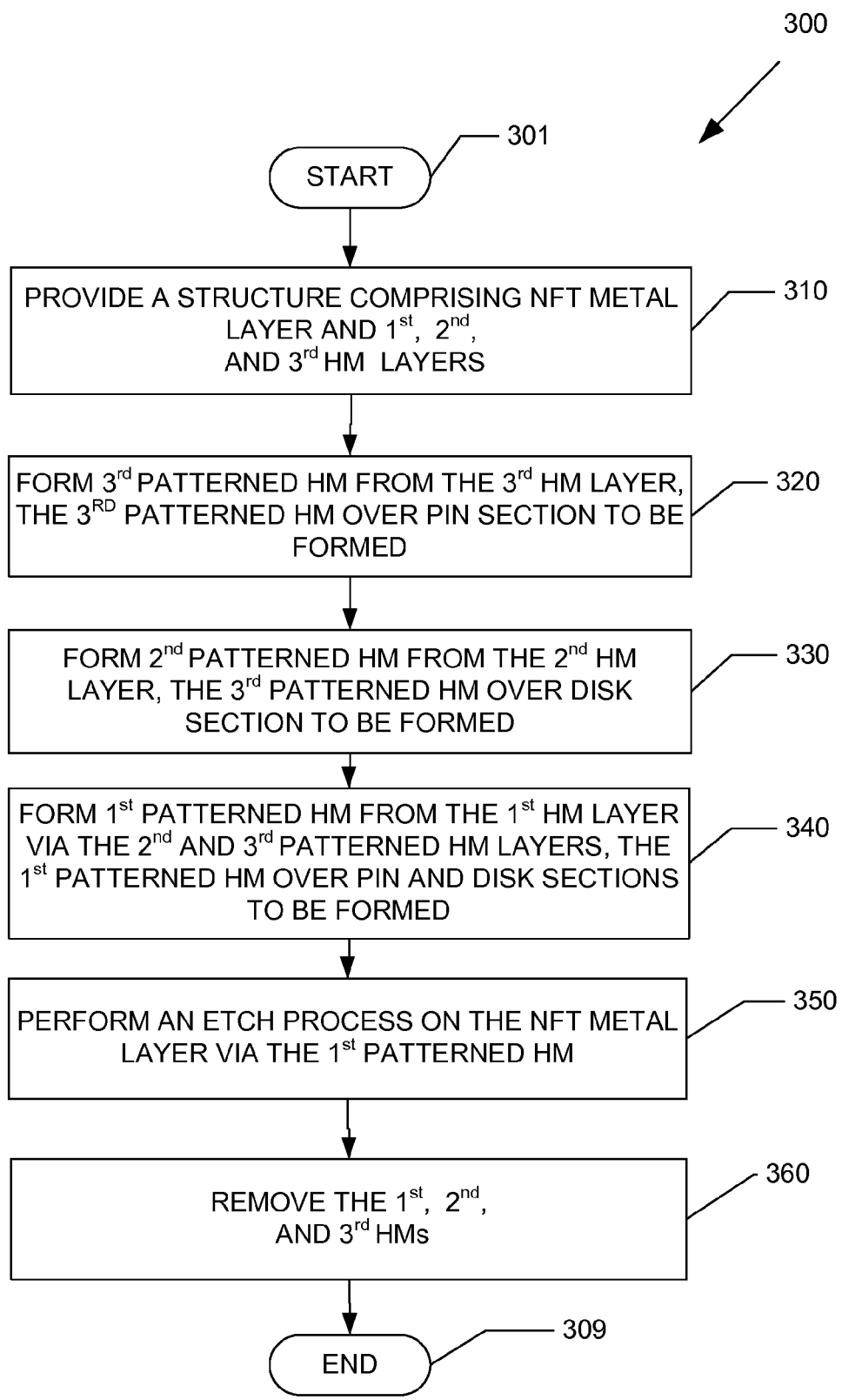
FIG. 3 is a flowchart illustrating an exemplary process for fabricating an NFT according to certain aspects of the subject disclosure.

FIG. 3 is a flowchart illustrating an exemplary process 300 for fabricating an NFT (e.g., 100 of FIG. 1) according to certain aspects of the subject disclosure. FIGS. 4A-4G depict structures arrived before, during, or after various operations of the process 300 of FIG. 3 according to certain aspects of the subject disclosure. Each of FIGS. 4A-4G provides a cross-sectional view (e.g., 401A) and a top view (e.g., 401B) of a corresponding structure. For ease of illustration, without any intent to limit the scope of the subject disclosure in any way, the process 300 will be described with reference to the structures 401A-407A, 401B-407B depicted in FIGS. 4A-4G.

Figure 4A:
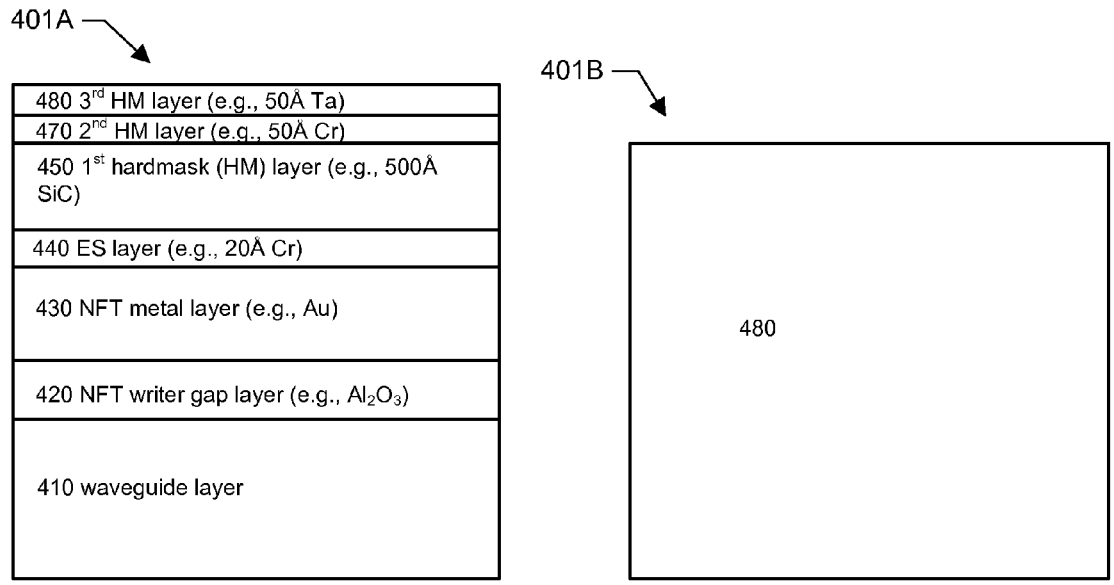
FIGS. 4A-4G depict structures arrived before, during, or after various operations of the process of FIG. 3 according to certain aspects of the subject disclosure.
Figure 4B:
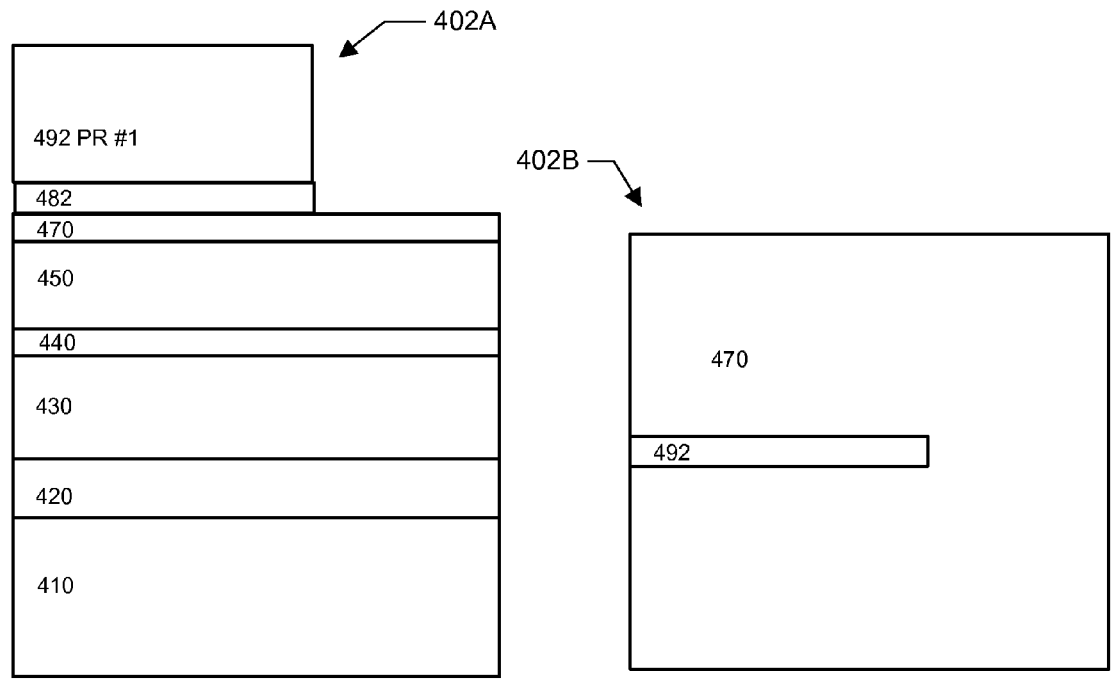

The process 300 begins at start state 301 and proceeds to operation 310, in which a structure, whose cross-sectional view 401A and top view 401B are depicted in FIG. 4A, is provided. As seen from the cross-sectional view 401A, the structure comprises a waveguide layer 410, an NFT writer gap layer 420 over the waveguide layer 410, an NFT metal layer 430 over the NFT writer gap layer 420, an etch stop (ES) layer 440 over the NFT metal layer 430, a first hardmask (HM) layer 450 over the ES layer 440, a second HM layer 470 over the first hardmask (HM) layer 450, and a third HM layer 480 over the second HM layer 470.

The waveguide layer 410 can include any transparent or semi-transparent material including, but not limited to, $TiO_2$, $Ta_2O_5$, Si, SiN, and ZnS, and can have a thickness in a range between about 1,200 and 2,000 Å. The NFT writer gap layer 420 can include, but are not limited to, an optical-grade ALD alumina, and can have a thickness in a range between about 100 and 200 Å. The NFT metal layer 430 can include any metal capable of supporting a surface-plasmon resonance (SPR) therein including, but not limited to Au, Ag, Al. and a combination thereof. The NFT metal layer 430 can have a thickness in a range between about 300 and 500 Å. The first HM layer 450 can include a material (e.g., dielectric) selected from the group consisting of SiC, amorphous carbon, and diamond-like carbon (DLC), and can have a thickness in a range between about 300 and 1,000 Å. In the illustrated example, the first HM layer 450 includes SiC and has a thickness of about 500 Å. The second HM layer 470 can include a material selected from the group consisting of Cr or CrN, and can have a thickness in a range between about 30 and 100 Å. In the illustrated example, the second HM layer 470 includes Cr and has a thickness of about 50 Å. The third HM layer 480 can include a material selected from the group consisting of Ta and $Ta_2O_5$, and can have a thickness in a range between about 30 and 100 Å. In the illustrated example, the third HM layer 480 includes Cr and has a thickness of about 50 Å.

The ES layer 440 can include any material that is resistant to the etch process used for etching the first HM layer 450 including, but not limited to, Cr, Ru, and CrN. In the illustrated example in which the first HM layer 450 comprises 500 Å-thick SiC, the ES layer 440 includes 20 Å-thick Cr. The second HM layer 470 also functions as an etch stop layer with respect to the etching of the third HM layer 480. In the illustrated example in which the third HM layer 480 comprises 50 Å-thick Ta, the second HM layer 470 is a 50 Å-thick Cr layer that is substantially resistant (e.g., etch selectivity of greater than 20:1) to the etch process (e.g., Ta RIE) used to etch the Ta layer 480.

The process 300 proceeds to operation 320, in which a third patterned HM 482 (FIG. 4B) is formed from the third HM layer 480. The third patterned HM 482 includes a shape of pin section 332 (FIG. 4G) of the NFT to be formed. In the illustrated example of FIG. 4B, the operation 320 includes forming a first patterned photoresist (PR #1) 492 over the third HM layer 480 and performing a first etch process (e.g., Ta RIE) to remove portions of the third HM layer 480 not covered by PR #1 492. The PR #1 492 can be formed by a suitable standard photolithography. The second HM layer 470 (e.g., Cr) functions as an etch stop for the first etch process. It shall be appreciated that the Ta—Cr combination for the third and second HM layers 480, 470 are exemplary only, and a multitude of other combinations including, but not limited to, Ta—CrN, $Ta_2O_5$—Cr, $Ta_2O_5$—Cr, Cr—Ta, Cr—$Ta_2O_5$, CrN—Ta, CrN—$Ta_2O_5$ may be employed.

Figure 4C:
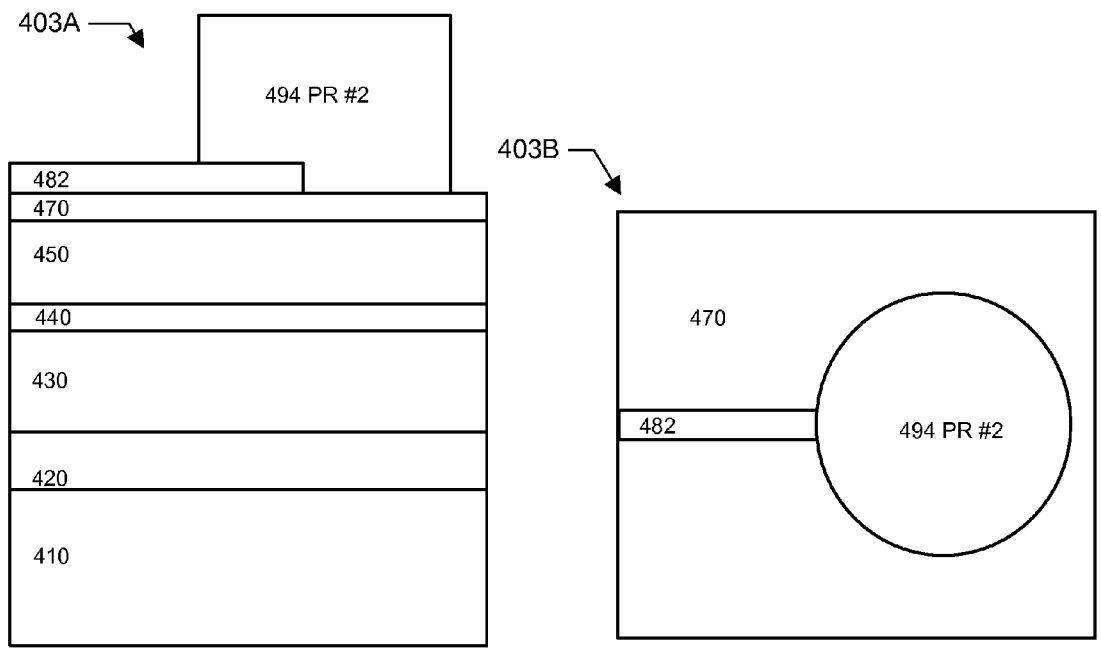
Figure 4D:
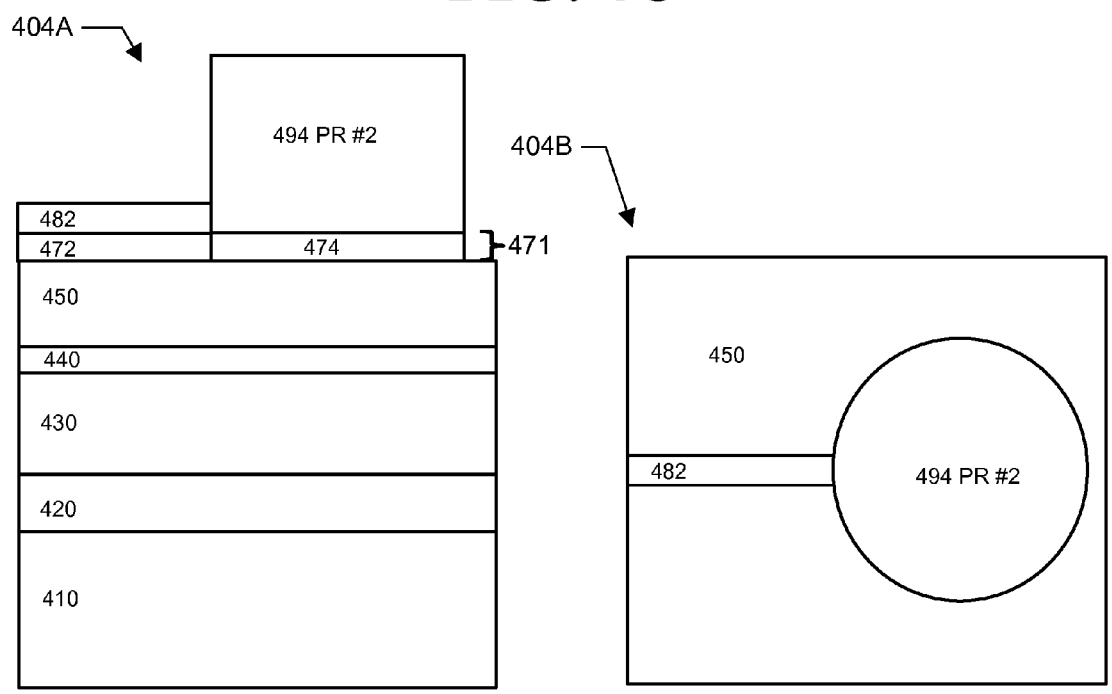

The process 300 proceeds to operation 330, in which a second patterned HM 471 having a first HM portion 472 and a second HM portion 474 is formed from the second HM layer 470 as illustrated by FIGS. 4C and 4D. In the illustrated examples of FIGS. 4C and 4D, the operation 330 includes forming a second patterned photoresist (PR #2) 494 over the second HM layer 470 and performing a second etch process (e.g., Cr RIE) to remove portions of the second HM layer 470 not covered by PR #2 494 and the third patterned HM 482. The PR #2 494 includes a shape of the disk section 434 of the NFT being formed. The PR #2 494 can be formed by a suitable standard photolithography. Because the PR #2 492 is a disk, not a hole, disk size (e.g., 135 of FIG. 1) can be made (e.g., printed) to be smaller than 200 nm. The disk size can get even smaller by the use of an $O_2$ plasma trim process. In the illustrated example of FIG. 4C, the PR #2 494 overlaps a portion of the third patterned HM 482. The overlapping helps to achieve a sharp corner between the pin and disk sections of the NFT to be formed. The first HM layer 450 (e.g., SiC) functions as an etch stop for the second etch process. In some alternative embodiments, an additional etch stop layer (e.g., Ta) may be inserted between the first HM layer 450 and the second HM layer 470 to stop the second etch process.

Figure 4E:
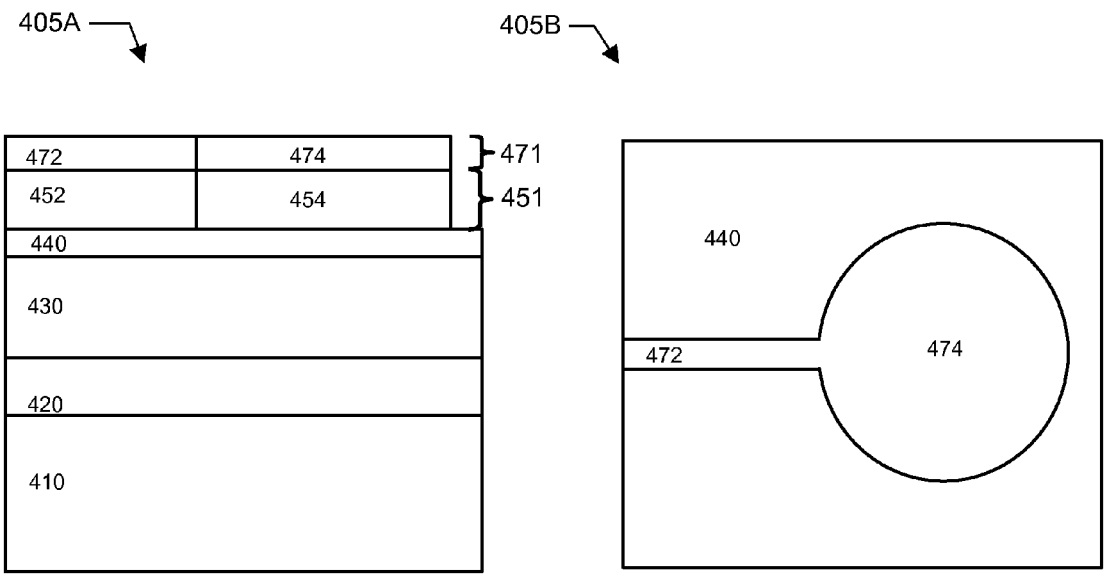

The process 300 proceeds to operation 340, in which a first patterned HM 451 having a first HM portion 452 and a second HM portion 454 is formed from the first HM layer 450 as illustrated by FIG. 4E. The first HM portion 452 of the first patterned HM 451 is disposed over the pin section 432 of the NFT to be formed, and the fourth HM portion 454 of the first patterned HM 451 is disposed over the disk section 434 of the NFT to be formed. The operation 340 includes performing a third etch process (e.g., $CF_4$ or $SF_6$ plasma RIE) to remove portions of the first HM layer 450 not covered by the second patterned HM 471. The ES layer 440 functions as an etch stop for the third etch process and protects the NFT metal layer 430 therefrom.

Figure 4F:
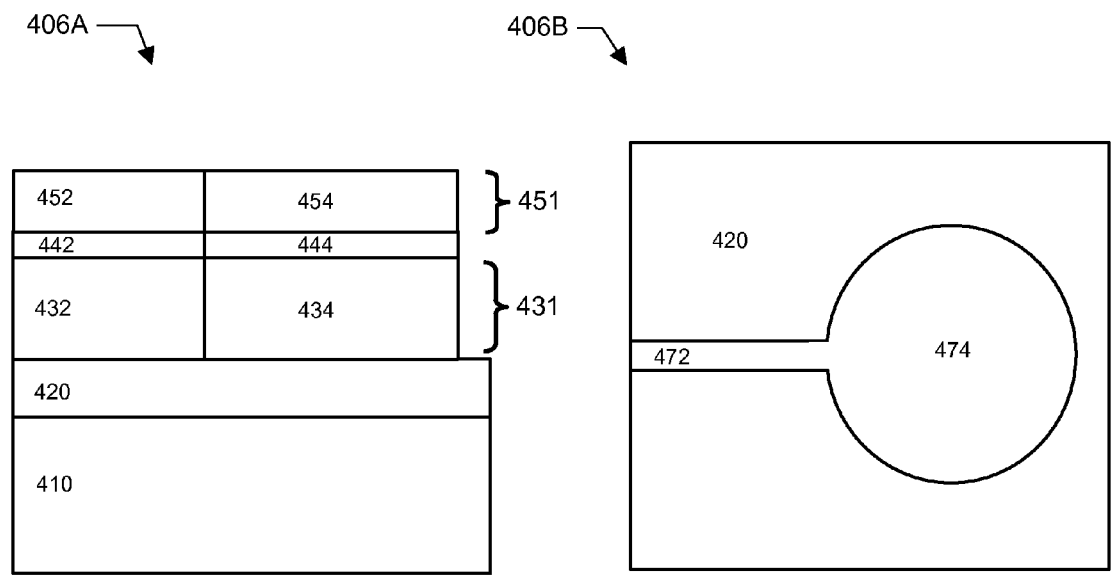

The process 300 proceeds to operation 350, in which a final NTE structure 431 having the pin section 432 and the disk section 434 is formed from the NFT metal layer 430 as illustrated by FIG. 4F. In the illustrated example of FIG. 4F, the operation 350 includes performing a fourth etch process (e.g., milling operation) to remove portions of the second ES layer 440 and the NFT metal layer 430 not covered by the first patterned HM 451. In the illustrated example of FIG. 4F, the NFT writer gap layer 420 (e.g., alumina) functions as an etch stop for the fourth etch process for milling of the NFT metal layer (e.g., Au). In some embodiments, the second HM 471 and an upper portion of the first HM 451 are removed during the fourth etch process.

Figure 4G:
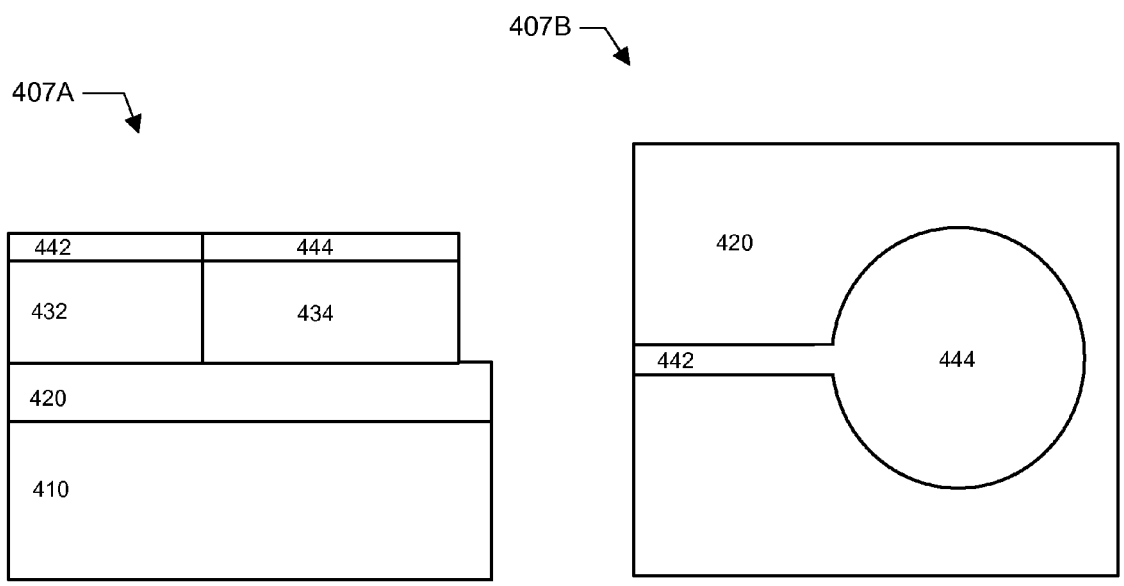

The process 300 proceeds to operation 360, in which the first patterned HM 451 is removed by, e.g., RIE process, leaving behind the structure whose cross-sectional view 407A and top view 407B are shown in FIG. 4G. Optionally, if there is an optical performance concern, residual portions 442, 444 of the second etch layer 440 can also be removed at the same time as or separately from the removal of the first patterned HM 451, e.g., by a wet etch process.

In the process 300 illustrated by FIGS. 3 and 4A-G, fabrication of the first patterned HM 451 involves forming the third patterned HM 482 having a shape of the pin section 432 followed by forming the second patterned HM 471 having a shape of the disk section 444. In certain alternative fabrication embodiments, this order can be reversed. For example, fabrication of the first patterned HM 451 can involve forming a third patterned HM having a shape of a pin section of the NFT to be formed followed by forming a second patterned HM having a shape of a disk section of the NFT to be formed.

Figure 5:
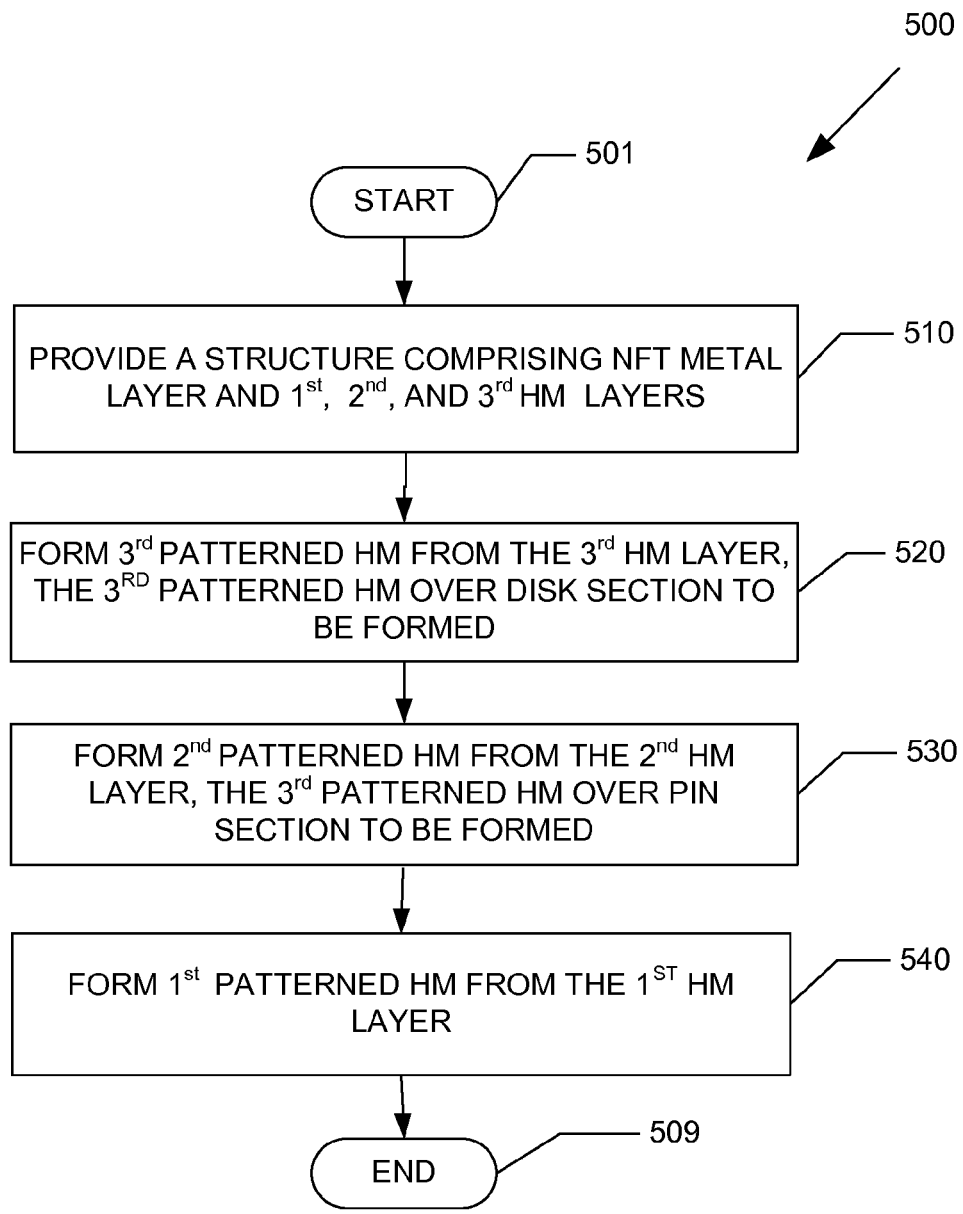
FIG. 5 is a flowchart illustrating an exemplary process for fabricating a first patterned HM to be used for forming (e.g., milling) an NFT structure according to such alternative embodiments of the subject disclosure.

FIG. 5 is a flowchart illustrating an exemplary process 500 for fabricating a first patterned HM (e.g., 451' of FIG. 6E) to be used for forming (e.g., milling) an NFT structure according to such alternative embodiments of the subject disclosure. FIGS. 6A-6E depict structures arrived before, during, or after various operations of the process 500 of FIG. 5 according to certain aspects of the subject disclosure. For ease of illustration, without any intent to limit the scope of the subject disclosure in any way, the process 500 will be described with reference to the structures depicted in FIGS. 6A-6E.

The process 500 begins at start state and proceeds to operation 510 in which a structure comprising a waveguide layer 410', an NFT writer gap layer 420' over the waveguide layer 410', an NFT metal layer 430' over the NFT writer gap layer 420', an ES layer 440' over the NFT metal layer 430', a first hardmask (HM) layer 450' over the first ES layer 440', a second HM layer 470' over the first hardmask (HM) layer 450', and a third HM layer 480' over the second HM layer 470' is provided. The layers 410', 420', 430', 440', 450', 470', and 480' are substantially similar to the corresponding layers 410, 420, 430, 440, 450, 470, and 480 of FIG. 4A, and are not repeated here for the sake of brevity.

The process 500 proceeds to operation 520, in which a third patterned HM 484' (FIG. 6B) is formed from the third HM layer 480'. The third patterned HM 484 includes a shape of disk section of the NFT to be formed (e.g., milled) via the first patterned HM 451' being fabricated. In the illustrated example of FIG. 6B, the operation 520 includes forming a first patterned photoresist (PR #1) 494 over the third HM layer 480' and performing a first etch process (e.g., Ta RIE) to remove portions of the third HM layer 480' not covered by PR #1 494. The second HM layer 470' (e.g., Cr) functions as an etch stop for the first etch process.

Figure 6A:
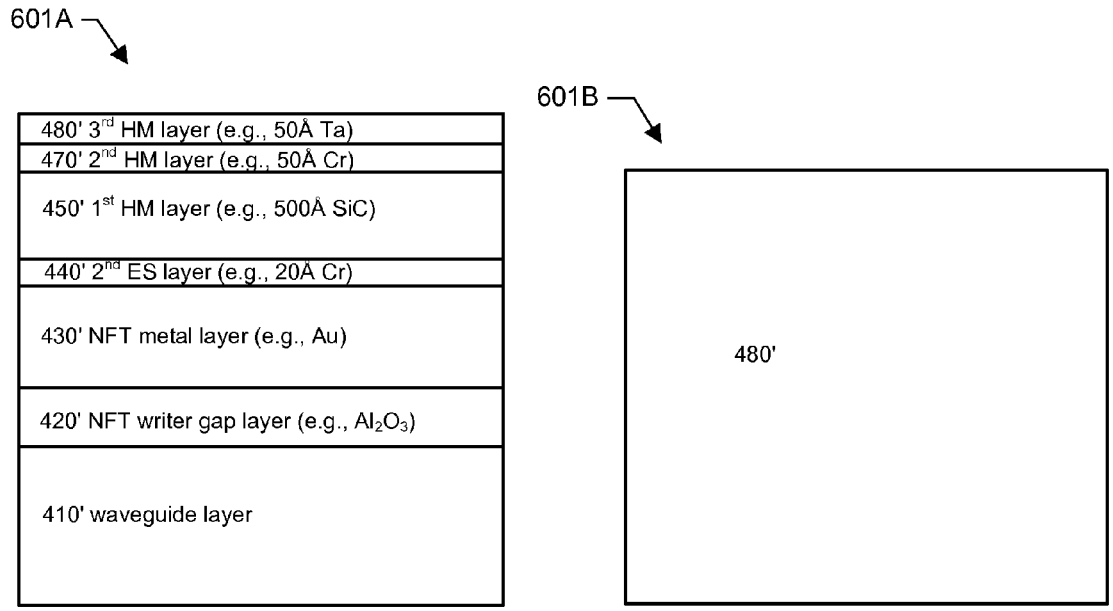
FIGS. 6A-6E depict structures arrived before, during, or after various operations of the process of FIG. 5 according to certain aspects of the subject disclosure.
Figure 6B:
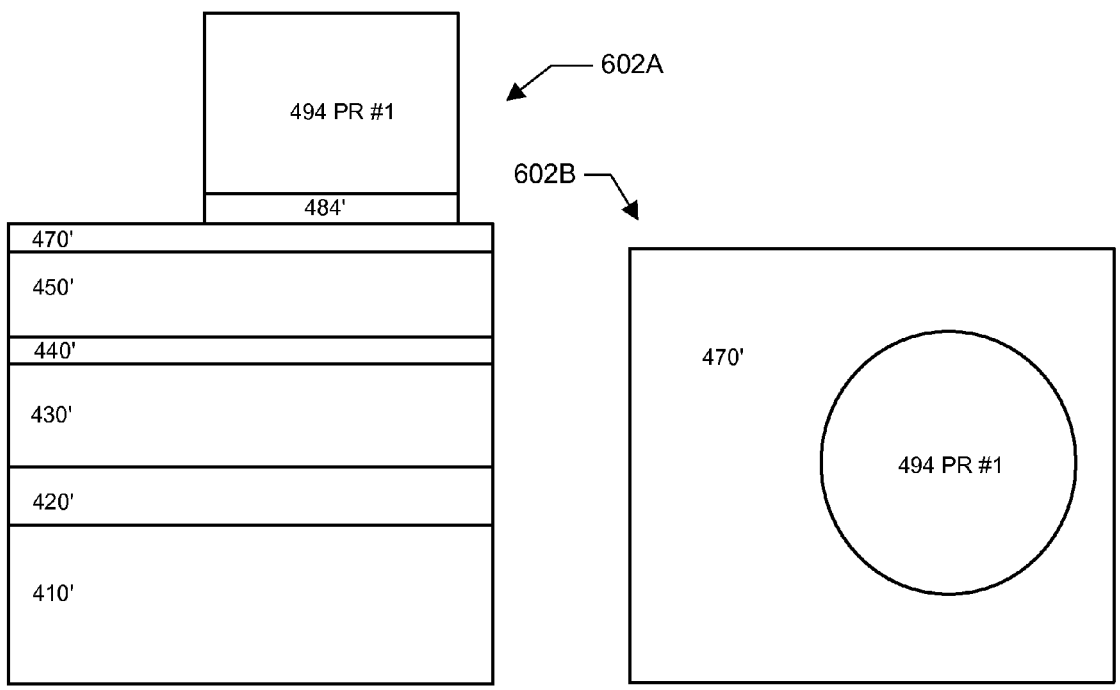
Figure 6C:
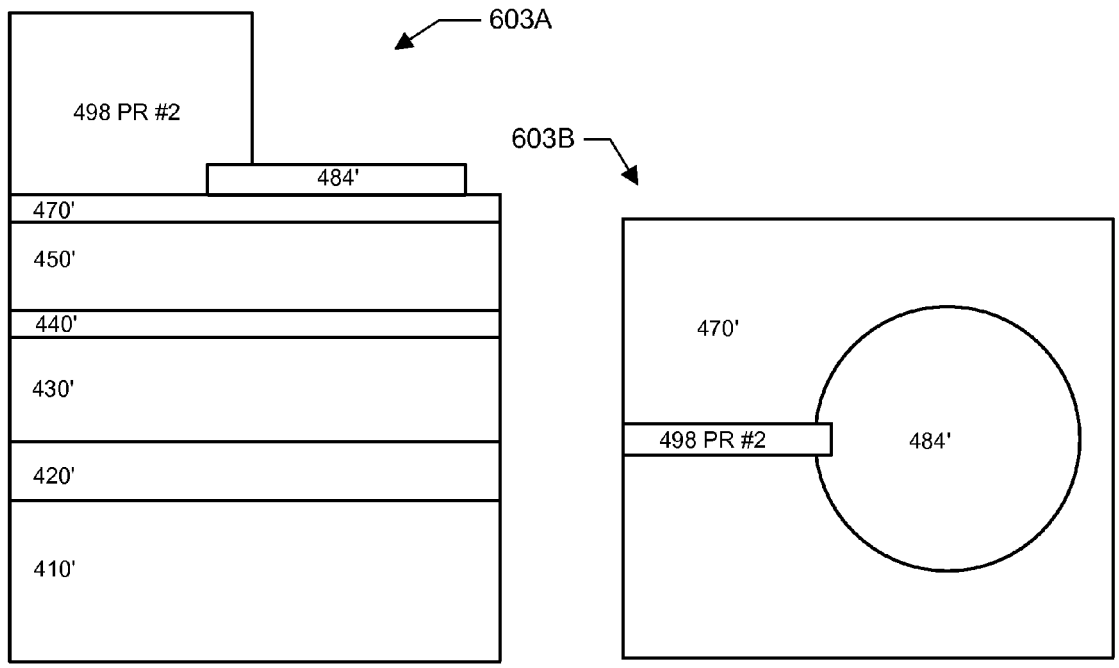
Figure 6D:
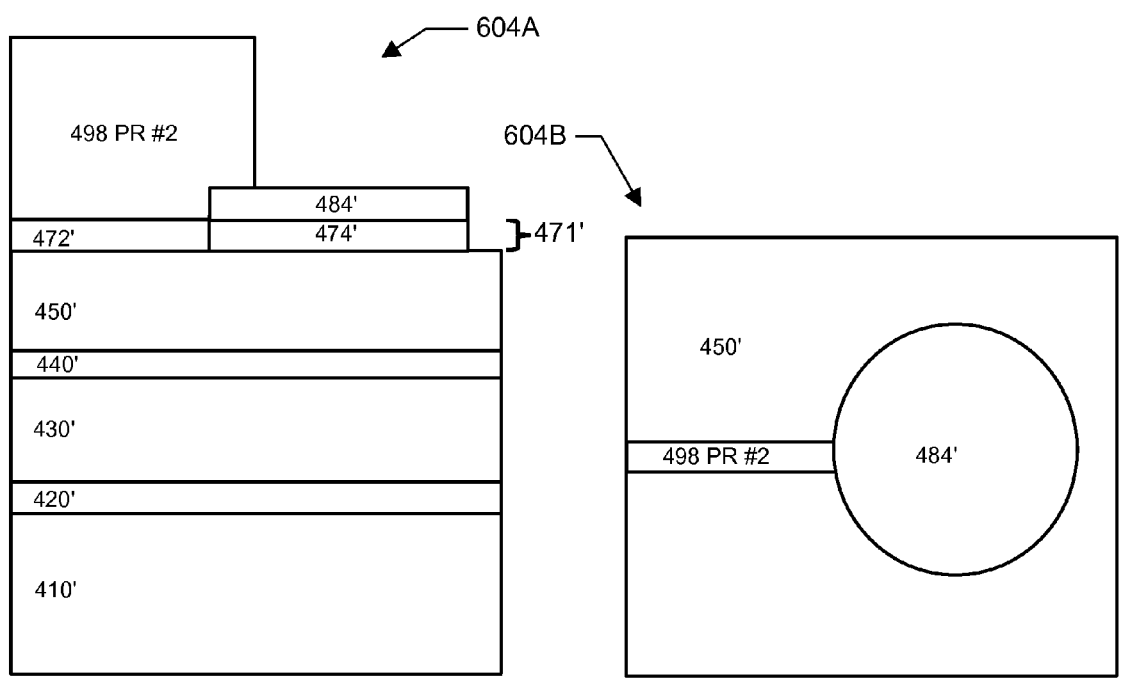

The process 500 proceeds to operation 530, in which a second patterned HM 471' having a first HM portion 472' and a second HM portion 474' is formed from the second HM layer 470' as illustrated by FIGS. 6C and 6D The second HM portion 472' is disposed over pin section of the NFT to be formed. In the illustrated examples of FIGS. 6C and 6D, the operation 530 includes forming a second patterned photoresist (PR #2) 498 over the second HM layer 470' and performing a second etch process (e.g., Cr RIE) to remove portions of the second HM layer 470' not covered by PR #2 498 and the third patterned HM 484'. In the illustrated example of FIG. 4C, the PR #2 498 overlaps a portion of the third patterned HM 484'. The first HM layer 450' (e.g., SiC) functions as an etch stop for the second etch process.

Figure 6E:
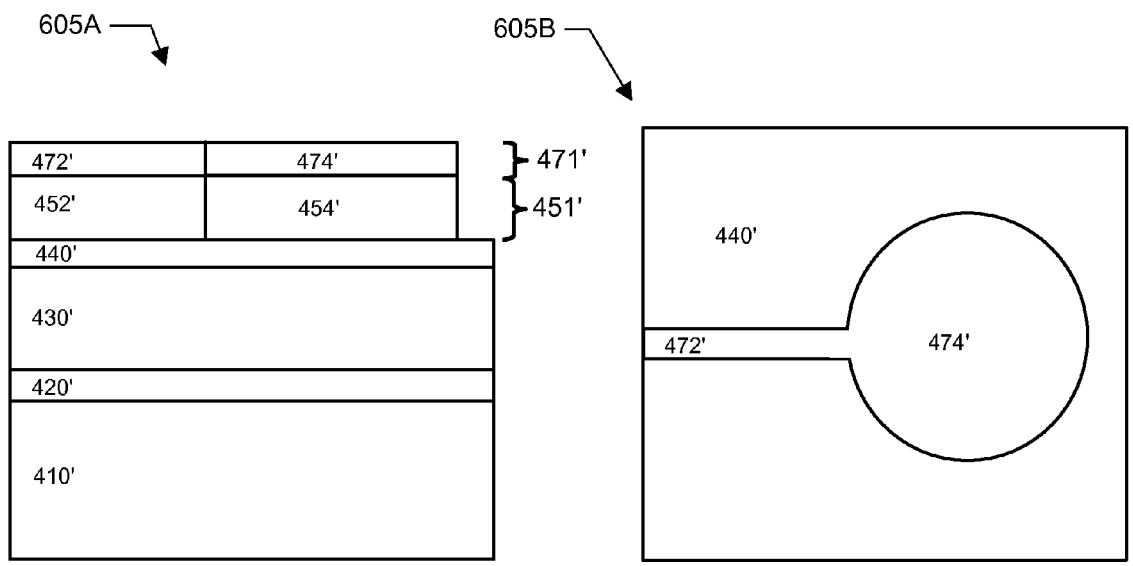

The process 500 proceeds to operation 540, in which a first patterned HM 451' having a first HM portion 452' and a second HM portion 454' is formed from the first HM layer 450' as illustrated by FIG. 6E. The first HM portion 452' of the first patterned HM 451' is disposed over the pin section of the NFT to be formed, and the fourth HM portion 454' of the first patterned HM 451' is disposed over the disk section of the NFT to be formed. In the illustrated example of FIG. 6E, the operation 540 includes performing a third etch process (e.g., SiC RIE) to remove portions of the first HM layer 450' not covered by the second patterned HM 471'. The ES layer 440' functions as an etch stop for the third etch process and protects the NFT metal layer 430' therefrom.

Figure 1:
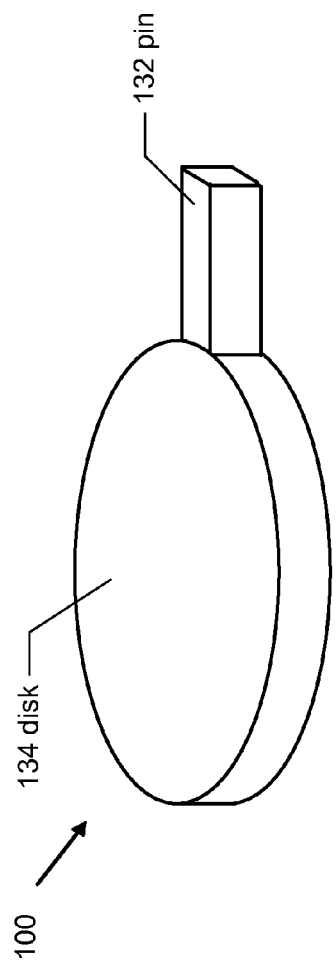
FIG. 1 is a diagram depicting a perspective view of an exemplary Puccini-type NFT.
Figure 2:
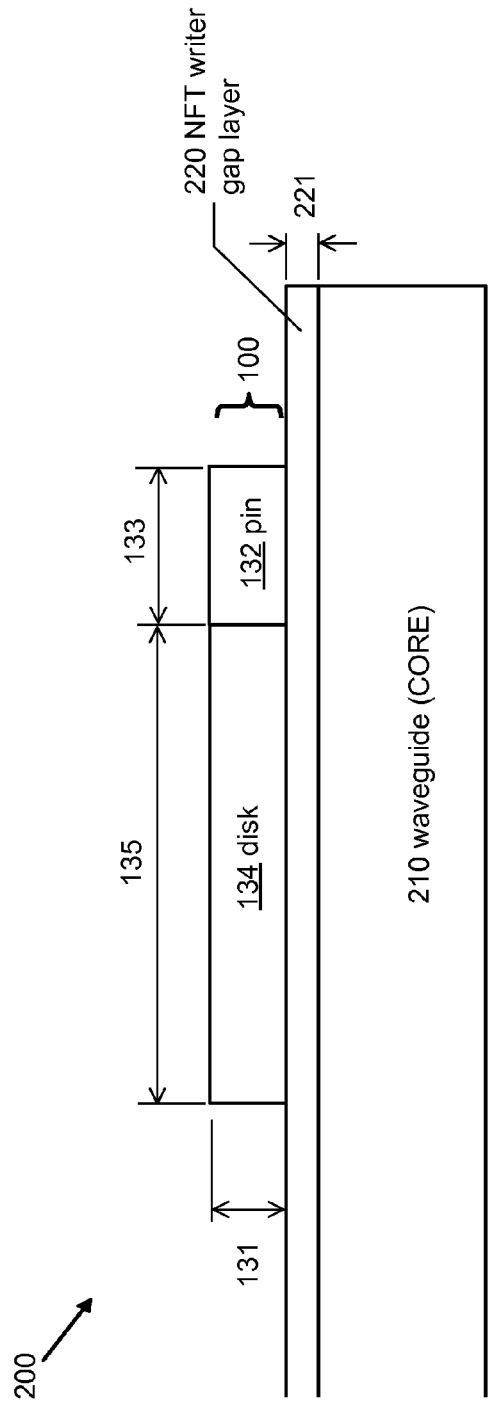
FIG. 2 is a diagram depicting a cross-sectional view of an NFT arrangement in which the NFT of FIG. 1 is coupled to a waveguide structure via an NFT writer gap layer.
Figure 7:
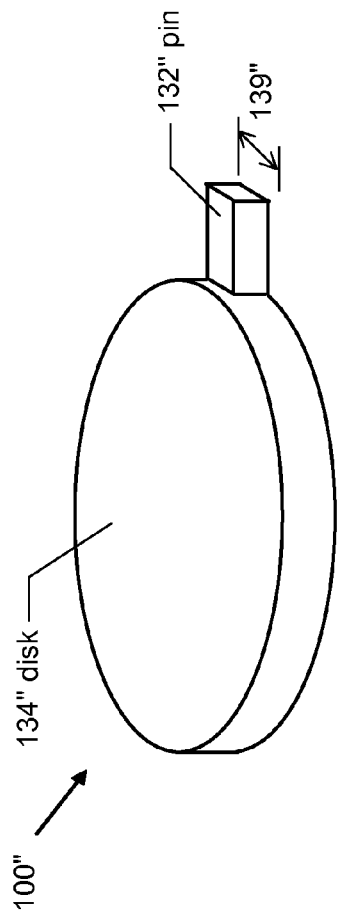
FIG. 7 is a diagram depicting a perspective view of an exemplary Puccini-type NFT in which pin section and disk section have different thicknesses according to certain aspects of the subject disclosure.
Figure 8:
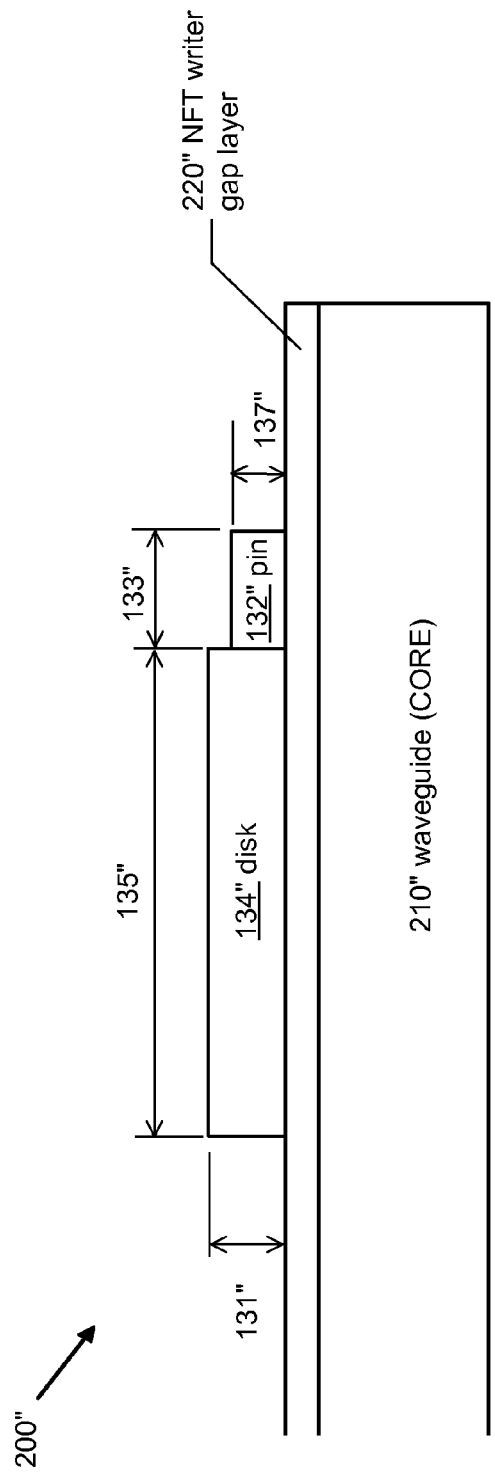
FIG. 8 is a diagram depicting a cross-sectional view of an NFT arrangement in which the NFT of FIG. 7 is coupled to a waveguide structure via an NFT writer gap layer according to certain aspects of the subject disclosure.

In the NFT structure 100 shown in FIGS. 1 and 2 and various related NFT fabrication processes described thereafter, the pin section 132 and the disk section 134 are assumed to have the same NFT thickness 131. However, in certain embodiments, disk section 134" and pin section 132" of NFT 100" have different thicknesses as shown in embodiments depicted in FIGS. 7 and 8. In the illustrated examples of FIGS. 7 and 8, the disk section 134" has disk thickness 131", and the pin section 132" has pin thickness 137". The pin section 132" has pin length 133", and the disk portion 134" has disk size (e.g., diameter) 135". As with the NFT arrangement 200 of FIG. 2, the NFT 100" can be coupled to waveguide 210" via an NFT writer gap layer 220". The NFT writer gap layer 220" provides writer gap 221" between the waveguide structure 210" and the NFT 100". In some embodiments, the pin thickness 137" can be in a range of between about 20 and 50 nm, and the disk thickness 131" can be in a range of between about 30 and 150 nm. In one exemplary NFT arrangement, the pin thickness 137" is 25 nm, the disk thickness 131" is 50 nm, the writer gap 220 is 20 nm, and the disk size 135' is 200 nm. The pin length 133" can be in a range of between about 0 and 50 nm. The pin section 132" can have a width 139" in a range of between about 15 and 50 nm.

Figure 9A:
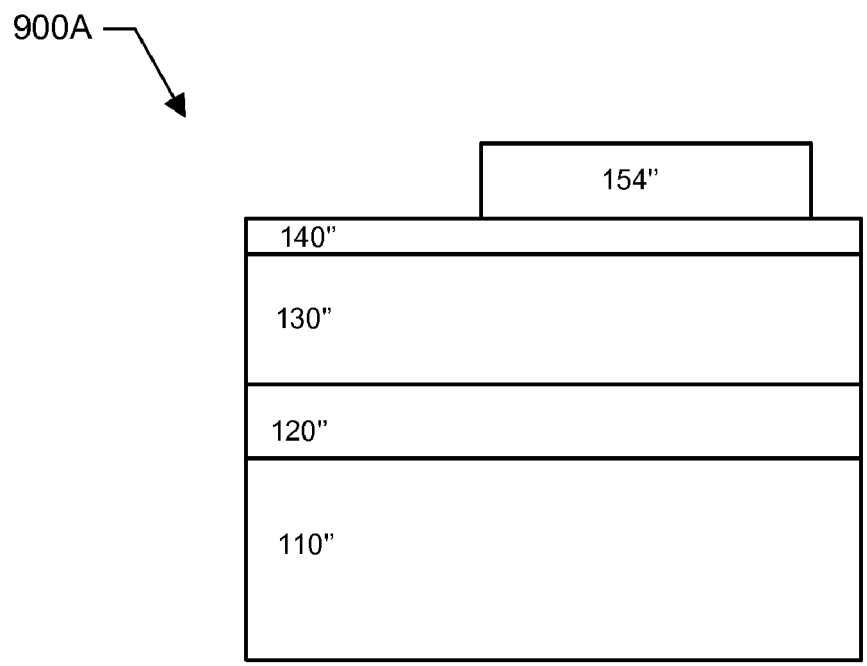
FIGS. 9A-9D are diagrams illustrating an exemplary two-step mill back method for fabricating an NFT having different disk and pin thicknesses according to certain aspects of the subject disclosure.

An exemplary two-step mill back method of fabricating an NFT 100" having different disk and pin thicknesses 131", 137" is now described. The two-step mill back method involves first forming a patterned SiC HM 154" over a region of NFT metal layer 130" corresponding to disk section 134" of the NFT 100" to be formed as illustrated by an intermediate structure 900A depicted in FIG. 9A. The intermediate structure 900A further comprises a waveguide core layer 110", an NFT writer gap layer 120" over the waveguide layer 110", and an etch stop layer 140" over the NFT metal layer 130". The patterned SiC HM 154" may be formed, for example, from a SiC layer deposited coextensively over the underlying layers 110"-140" by an etch process (e.g., RIE) performed via a patterned photoresist accompanied by a photo $O_2$ plasma trimming. The etch process is terminated at the etch stop layer 140".

Figure 9B:
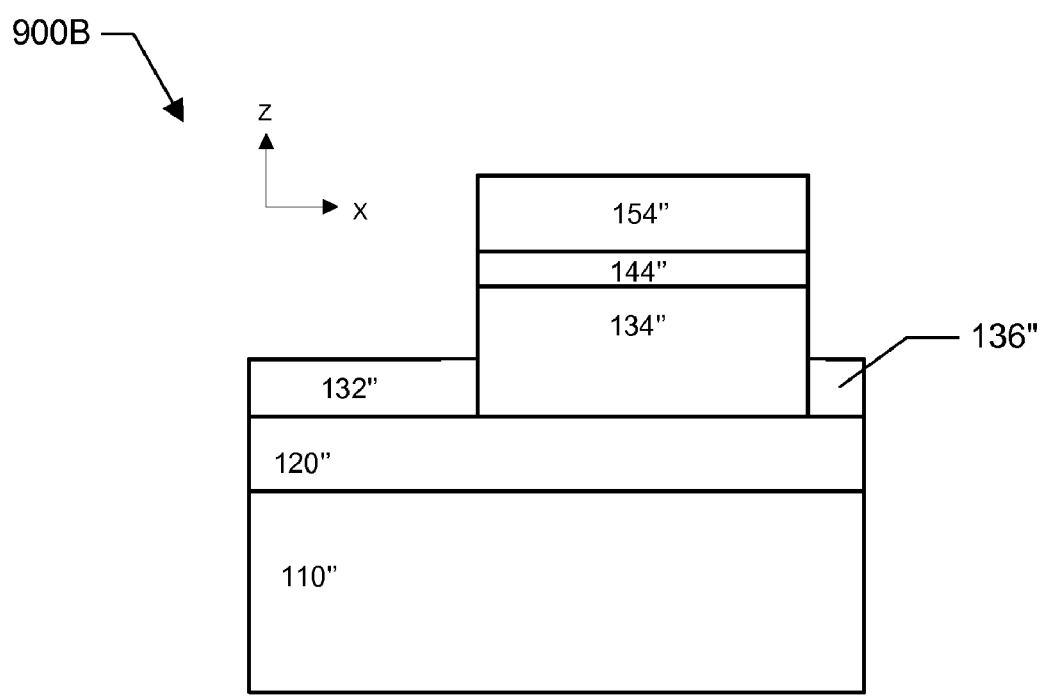

Subsequently, the disk section 134" is formed from the NFT metal layer 130", e.g., by performing a first milling (e.g., ion-milling) process preformed on the NFT metal layer via the patterned SiC HM 154" to remove portions in a lateral direction (e.g., x-direction) of the NFT metal layer not covered by the patterned SiC HM,154". As illustrated by an intermediate structure 900B depicted in FIG. 9B, the first milling operation only partially removes material of the NFT metal layer 130" in the thickness direction (e.g., z-direction) of the layer 130" to form the thinner pin section 132". The partial thickness-direction removal of the NFT metal layer 130" is achieved by, e.g., controlling an end point of the first milling operation (e.g., ending the first milling operation after a time duration X that is known to remove a thickness Y). After the first milling operation is performed on the NFT metal layer 130", the disk section 134", the pin section 132", and residual NFT metal portion 136" remain of the NFT metal layer 130" as illustrated by the intermediate structure 900B of FIG. 9B.

Figure 9C:
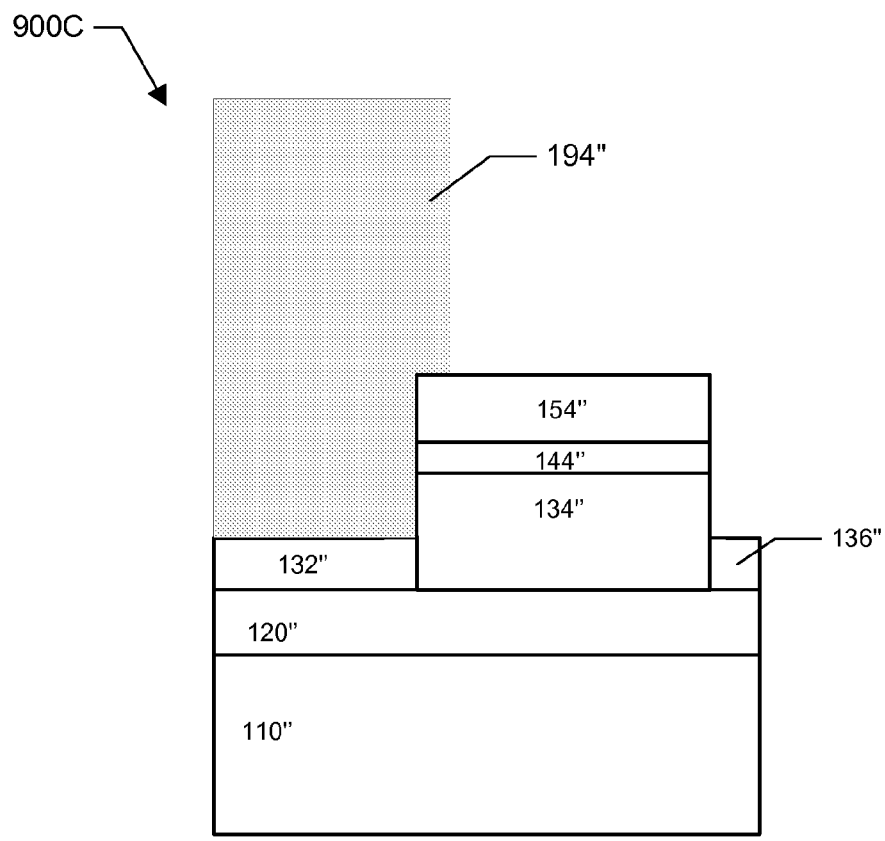
Figure 9D:
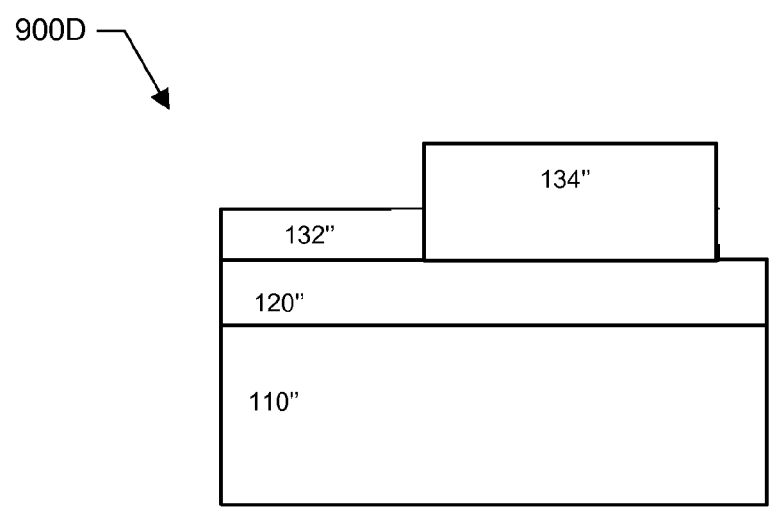

After the first ion-milling process, a pin mask 194" (e.g., a PR or hardmask) having a shape of the pin section 132" is formed over an exposed region (e.g., the region not covered by the disk section 154') of the NFT metal layer and stitched with the previously-formed disk section 154'. In some embodiments, the pin mask 194" overlaps a portion of the disk section 154" as illustrated by intermediate structure 900C depicted in FIG. 9C. Subsequently, the residual NFT metal portion 136" is removed by a second milling (e.g., ion-milling) process performed via the pin mask 194" and the disk section 154". The pin mask 194" and the disk section 154" (and optionally residual etch stop 144") are subsequently removed as illustrated by structure 900D depicted in FIG. 9D.

Those skilled in the art shall appreciate that various NFT fabrication methodologies of subject disclosure provide a number of advantages including the following:

1) NFT writer gap (e.g., 220) can be controlled accurately because the writer gap is defined by deposition of writer gap layer (e.g., 420, 120") and subsequent milling and photolithography do not affect the writer gap layer.
2) NFT disk thickness (e.g., 131, 131") can be controlled accurately because the NFT disk thickness is defined by deposition of NFT metal layer (e.g., 430, 130"). Furthermore, in the case of an NFT (e.g., 100") having different disk and pin thicknesses (131", 137"), the NFT pin thickness (e.g., 137") can be controlled by using an end-point controlled milling process.
3) Disk size (e.g., 135, 135") is extendable because there is no process limitation for the disk size.
4) Disk shape is well defined due to a large etch selectivity between the third HM layer (480, 180") and second HM layer (470, 170").

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A method of forming a near field transducer (NFT) for energy assisted magnetic recording, the method comprising:
   providing a structure comprising an NFT metal layer and a first hardmask layer over the NFT metal layer;
   forming a first patterned hardmask from the first hardmask layer, the first patterned hardmask disposed over a disk section and a pin section of the NFT to be formed; and
   performing an etch process on the NFT metal layer via the first patterned hardmask, the etch process forming the NFT having the disk section and the pin section.

2. The method of claim 1, where the NFT metal layer comprises a metal selected from a group consisting of Au, Ag, Al, and a combination thereof.

3. The method of claim 1, wherein the first hardmask layer comprises a material selected from a group consisting of SiC, amorphous carbon, and diamond-like carbon (DLC).

4. The method of claim 1, wherein the first hardmask layer has a thickness in the range between about 30 and 100 nm.

5. The method of claim 1, wherein the structure further comprises a waveguide core layer below the NFT metal layer, an NFT writer gap layer between the waveguide core layer and the NFT metal layer, a second hardmask layer over the NFT metal layer, and a third hardmask layer over the second hardmask layer.

6. The method of claim 5, wherein forming the first patterned hardmask comprises:
   forming a third patterned hardmask from the third hardmask layer, and
   forming a second patterned hardmask from the second hardmask layer, the second patterned hardmask overlapping a portion of the third patterned hardmask.

7. The method of claim 6, wherein the third patterned hardmask has a shape of the disk section of the NFT to be formed.

8. The method of claim 6, wherein the third patterned hardmask has a shape of the pin section of the NFT to be formed.

9. The method of claim 6, wherein forming the third patterned hardmask comprises forming a first patterned photoresist over the third hardmask layer, and performing a first reactive ion etching process on the third hardmask layer via the first patterned photoresist.

10. The method of claim 9, wherein the first reactive ion etching process is stopped at the second hardmask layer.

11. The method of claim 10, wherein:
   the third hardmask layer comprises Ta or $Ta_2O_5$,
   the second hardmask layer comprises Cr or CrN, and
   the first hardmask layer comprises SiC, amorphous carbon, or diamond-like carbon (DLC).

12. The method of claim 9, wherein forming the second patterned hardmask comprises forming a second patterned photoresist over the second hardmask layer and over a portion of the third patterned hardmask, and performing a second reactive ion etching process on the second hardmask layer via the second patterned photoresist and the third patterned hardmask.

13. The method of claim 12, wherein the second reactive ion etching process is stopped at the first hardmask layer.

14. The method of claim 13, wherein the second hardmask layer comprises Cr, and the second etch stop layer comprises Ta.

15. The method of claim 6, wherein forming the first patterned hardmask further comprises performing a third reactive ion etching process on the first hardmask layer via the second patterned hardmask.

16. The method of claim 15, wherein the third reactive ion etching process is stopped at an etch stop layer disposed between the first hardmask layer and the NFT metal layer.

17. The method of claim 16, wherein the first hardmask layer comprises SiC and the third etch stop layer comprise Cr.

18. The method of claim 5, wherein the etch process performed on the NFT metal layer comprises a milling process on the NFT metal layer, the milling process stopped at the NFT writer gap layer.

19. The method of claim 1 further comprising removing the first patterned hardmask layer.

20. A method of forming a near field transducer (NFT) for energy assisted magnetic recording, the method comprising:
   providing a structure comprising an NFT metal layer and a hardmask layer over the NFT metal layer;
   forming a patterned hardmask from the hardmask layer, the patterned hardmask disposed over at least a disk section of the NFT to be formed; and
   removing a portion of an exposed region of the NFT metal layer not covered by the patterned hardmask, thereby forming at least the disk section of the NFT.

21. The method of claim 20, wherein the patterned hardmask is disposed also over a pin section the NFT to be formed, and the removing forms the pin section and the disk section of the NFT simultaneously.

22. The method of claim 20, wherein the patterned hardmask is disposed over the disk section of the NFT to be formed, the method further comprising forming a pin section of the NFT after forming the disk section.

23. The method of claim 22, wherein forming the pin section comprises:
   forming a pin mask over the exposed region of the NFT metal layer after the removing, the pin mask having a shape of the pin section and overlapping a portion of the patterned hardmask; and
   milling a portion of the exposed region not covered by the pin mask.

24. The method of claim 22, wherein the structure further comprises a waveguide core layer and an NFT writer gap layer between the waveguide core layer and the NFT metal layer.

25. The method of claim 24, wherein the NFT writer gap layer comprises a dielectric material.

26. The method of claim 25, wherein the dielectric material is alumina.

27. The method of claim 23, wherein the disk section has a diameter less than about 200 nm.

* * * * *